United States Patent [19]

Kuwano et al.

[11] 4,003,559
[45] Jan. 18, 1977

[54] APPARATUS FOR RECOVERY OF METALLIC ZINC FROM DROSS

[75] Inventors: Kiyoharu Kuwano, Tamano; Yukio Kanbara, Shimonoseki, both of Japan

[73] Assignee: Mitsui Mining & Smelting Co., Ltd., Tokyo, Japan

[22] Filed: Apr. 24, 1975

[21] Appl. No.: 571,173

[52] U.S. Cl. .............................. 266/204; 266/227; 209/465
[51] Int. Cl.² .......................................... C22B 9/02
[58] Field of Search ............. 75/24, 30, 61, 63, 64, 75/86, 93 R; 266/37, 227, 233, 235, 204; 209/172.5, 465; 210/523, 528, 530, 531, 534

[56] References Cited

UNITED STATES PATENTS

| 781,406 | 1/1905 | Devereux | 209/465 |
|---|---|---|---|
| 1,169,479 | 1/1916 | Grundler | 209/172.5 |
| 2,172,792 | 9/1939 | Hall | 209/465 |
| 2,289,112 | 7/1942 | Fischer | 210/530 |
| 3,198,505 | 8/1965 | Amdur et al. | 266/37 |
| 3,857,699 | 12/1974 | Ammann et al. | 75/63 X |

FOREIGN PATENTS OR APPLICATIONS

| 503,530 | 6/1954 | Canada | 209/465 |
|---|---|---|---|
| 201,817 | 8/1923 | United Kingdom | 266/37 |

*Primary Examiner*—Roy Lake
*Assistant Examiner*—Paul A. Bell
*Attorney, Agent, or Firm*—Sughrue, Rothwell, Mion, Zinn & Macpeak

[57] ABSTRACT

An apparatus for separating and recovering metallic zinc from an ash-like solid substance composed of a mixture of metallic zinc, zinc oxide and other zinc containing materials is disclosed. This apparatus comprises a saucer-like container of an inverse cone form for receiving dross and a plurality of agitating scraper plates disposed in said container to squeeze out metallic zinc from the dross, discharge means for metallic zinc and discharge means for secondary dross being mounted on an opening formed on the bottom of said cylinder.

7 Claims, 2 Drawing Figures

APPARATUS FOR RECOVERY OF METALLIC ZINC FROM DROSS

BACKGROUND OF THE INVENTION

This invention relates to an apparatus for separating and recovering metallic zinc from an ash-like solid substance composed of a mixture of metallic zinc, zinc oxide and other zinc containing materials.

Zinc is an easily-oxidizable metal, and hence, a molten zinc bath in a melting furnace or the like has the surface covered with oxides. Further, this surface layer of oxide entangles therein a large amount of metallic zinc and its fluidity is very low. Accordingly, this surface layer of oxide generally is in the form of a hard and thick layer. For this reason, there is customarily adopted an operation of scattering a flux, generally a flux of the chloride type, on the surface of a molten zinc bath, separating and recovering metallic zinc involved in the oxide layer by manual agitation. By this operation, the fluidity of the oxide layer is increased and the majority of metallic zinc involved in the oxide layer is recovered into the zinc bath. However, a considerable amount of metallic zinc is still contained in the oxide layer mainly in the form of fine particles. This amount of residual zinc differs greatly depending on the configuration of the surface state of starting materials to be melted or on the fluxing method. For example, in the case of a starting material having a large surface area such as zinc sheets deposited in the electrolysis, the amount of such residual zinc is as large as 1 to 4% by weight based on the starting material. In case such mixture composed of zinc and its oxide (hereinafter referred to as "dross") is treated in the zinc refining process, considerable processing expenses are required for this treatment. Therefore, various methods have heretofore been practised to squeeze out the metal from the dross and thereby obtain a final product directly from the dross.

The conventional methods comprise charging into a vessel having an inclined bottom face dross scraped out of a melting furnace, agitating the dross manually by means of an iron rod provided with scrape plates and thus squeezing out metallic zinc from the dross. According to this method, just before or during the operation a flux or zinc dust is sometimes added to utilize the heat generated by the oxidation reaction. In this method, however, since agitation is performed manually, no uniform agitation can be attained and further, because of the individual metallic zinc particles having the surface covered with a thin oxide layer, the heat resulting from reaction with the flux can not be utilized effectively. Therefore, the metal recovery ratio is relatively low, for example about 40% by weight. Further, considerable labors are required for practice of this method.

As another conventional method, there can be mentioned a method for obtaining crude zinc by melt-extracting a zinc-containing material such as dross, hard zinc and zinc die-cast alloy scrap with use of a rotary furnace. This method is characterized in that a variety of starting materials including the above-mentioned, ash-like dross, scrap metal and chipped metal masses can be treated. Further, in this method, since a high agitation effect can be attained, there is obtained an advantage that the metal recovery ratio is increased. However, the apparatus used is a rotary furnace having a complicated structure and a large size, and since the ratio of filling of the starting material into the furnace is 10 to 40% at most and a large quantity of heat escapes from the furnace, the furnace should be heated directly or indirectly even when hot dross coming from a zinc melting furnace is treated. Moreover, when the ash-like dross is treated, a considerable amount of dusts is carried over from the furnace with its rotation and metallic zinc is partially oxidized and further, since chlorine compounds are contained in such dusts, they are deposited and fixed in ducts of a dust precipitator, resulting in blocking up of a gas passage.

SUMMARY OF THE INVENTION

It is therefore a primary object of this invention to provide a compact apparatus for recovery of metallic zinc from the dross in which the filling ratio of dross is increased and metallic zinc is effectively squeezed out from the dross without external supply of heat and use of a flux.

More specifically, in accordance with this invention, there is provided an apparatus for recovering metallic zinc in dross discharged from a zinc melting furnace, which comprises a saucer-like container for receiving dross, said container having a bottom portion of an inverse conical form inclined downwardly, and a plurality of agitating scraper plates supported around a vertical rotary shaft in said container to squeeze out metallic zinc from dross, discharge means for metallic zinc and discharge means for secondary dross consisting mainly of oxides being mounted on an opening formed on the bottom of said container.

DETAILED DESCRIPTION OF THE INVENTION

The apparatus of this invention can be attached easily at an appropriate position in the proximity of a zinc melting furnace. When the apparatus of this invention is employed, it is unnecessary to add a heat generating material, e.g. a flux or supply heat from the outside during the operation of recovering metallic zinc from dross. In other words, the intended recovery can be accomplished mechanically by utilizing only the heat of the dross per se.

An embodiment of the apparatus of this invention will now be described by reference to the accompanying drawings.

Figure 1:
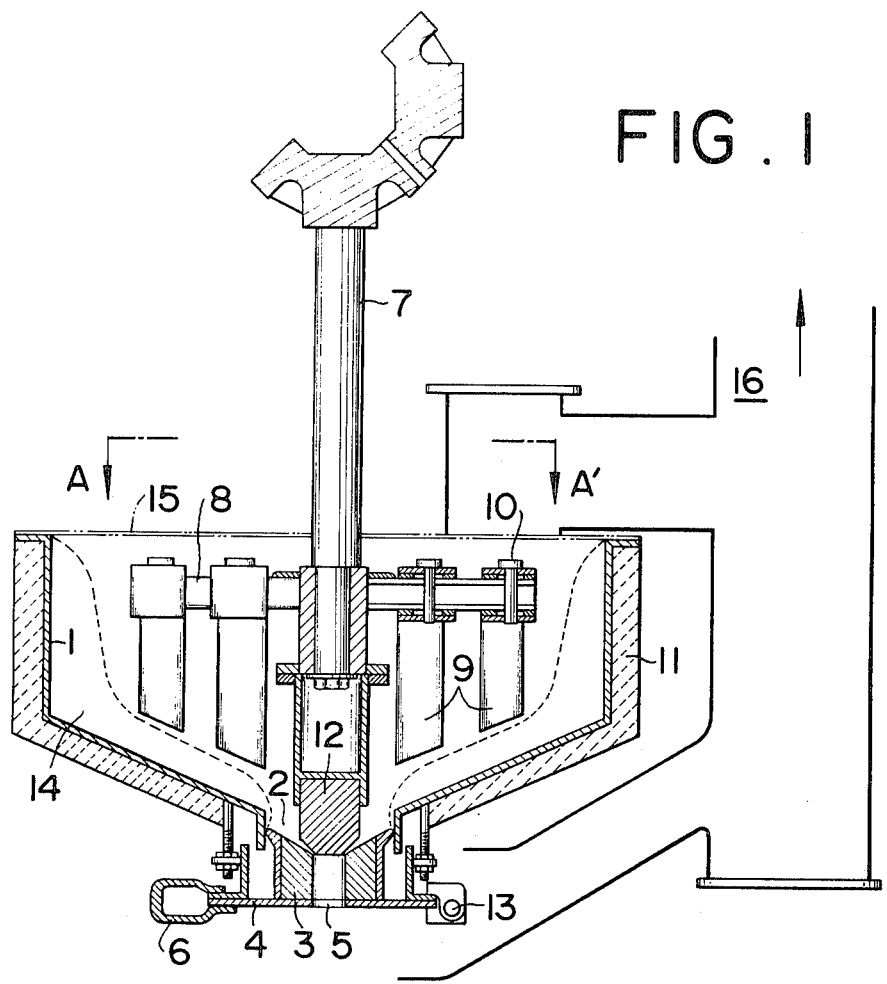
FIG. 1 is a diagram showing the longitudinal section of an embodiment of the metallic zinc recovery apparatus of this invention.

Referring to FIG. 1, a saucer-like container 1 composed of a steel plate is disposed to receive dross scraped out from a melting furnace, and the bottom portion of the container has an inverse conical form with such a gradual inclination angle that fine streams or liquid drops of molten metal squeezed out from the dross are collected to a central opening 2 along the inclined face of the container 1. The outer periphery of the container 1 is covered with a heat insulating material 11 so that escape of heat from the container is prevented.

A plurality of scrape plates 9 composed of a special steel or heat-resistant porcelain are fitted around a rotary shaft 7 in the container 1 to agitate dross and squeeze out molten zinc from the dross. A rotor 12 composed of graphite which rotates together with the rotary shaft 7 is attached to the end of the rotary shaft 7 to separate and recover the squeezed out molten zinc from the dross.

A hollow cylinder 3 composed of a heat-resistant, anti-corrosive material such as graphite and heat-resistant mortar is disposed at the opening 2 perforated through the center of the conical bottom of the container 1 as the discharge means for secondary dross, and this hollow cylinder 3 is supported by a supporting plate 4. One end of this supporting member 4 is pivoted on a fulcrum 13 and the other end is fixed by a clamp 6. The upper portion of the cylinder 3 takes a conical form with an inclination angle almost equal to that of the bottom portion of the container 1 and it has an almost linear contact with the lower peripheral edge of the rotor 12 to form a slight aperture therebetween as shown in FIG. 1. When such discharge mechanism is adopted, molten zinc having a large specific gravity and a good fluidity is withdrawn from a hole 5 through the slight aperture of this linear contact area while rotating the rotor 12 and falls into a casting mold (not shown) disposed below. On the other hand, the secondary dross is not allowed to pass through this slight aperture but is retained in the container 1. When squeezing out of metallic zinc is completed, the clamp attached to the supporting member 4 is dismounted, and a lower rail including the cylinder 3 and supporting member 4 is rotated around the fulcrum 13 to discharge the secondary dross consisting mainly of the oxides.

Details of the apparatus of this invention having the above principal structure and procedures of operation of the apparatus will now be described.

A considerable clearance is formed between the wall of the container and the scraper plate 9 and the dross is coated on this clearance as indicated by reference numeral 14 in FIG. 1, whereby the wall of the container (steel plate) can be prevented from corroding since it does not come into contact with the molten zinc and further, the temperature of the dross to be treated can be maintained. As further means for maintaining the temperature for operation, when the operation of the apparatus is interrupted, there is adopted a method in which the hot secondary dross from which molten zinc has been squeezed out is not discharged but left in the container and it is first discharged when the subsequent dross treatment is initiated.

According to a preferred example of the manner for attaching scraper plates 9, four arms 8 are fixed to the rotary shaft 7 so that they are spaced from one another by an angle of 90° and two each (8 in total) of the plates 9 are fitted to respective arms 8 by means of set boards 10. In order to enhance the squeezing effect, it is preferred that each scraper plate 9 be inclined with respect to the arm by an angle of 45° so that when the rotary shaft 7 is rotated in the clockwise direction (in the direction indicated by an arrow in FIG. 2), the scraper plate 9 functions to scrape up the dross along the inclined face of the conical bottom portion of the container and thus squeezes out metallic zinc. Further, in order to collect the squeezed zinc conveniently, it is preferred that the lower side of the scraper plate 9 be substantially in parallel to the inclined face of the bottom portion of the container as shown in FIG. 1. The number of arms, and the size and number of scraper plates attached to each arm are appropriately determined and changed depending on the size of the squeezing apparatus, and these elements are not particularly critical in this invention.

The shaft 7 may be rotated in one fixed direction. In this case, however, if a void portion corresponding to the passage of the scraper plate is formed in the dross, the agitating and squeezing effects are reduced. Accordingly, it is preferred that the direction of rotation of the rotary shaft be changed to an opposite direction at every prescribed interval.

Another advantage of the apparatus of this invention is that the filling ratio of dross is as high as more than 90%, which results in diminution of the size of the apparatus and increase of the temperature-maintaining effect. Further, since the rotation frequency of the scraper plates is 10 to 20 rotations at highest per minute, generation of dusts can be greatly reduced. Moreover, the upper portion of the container is isolated from the outer environment by means of a lid 15 having a dross feed opening and an exhaust opening connected to a dust precipitator 16. Accordingly, good working conditions can be maintained in the working environment. If a sliding system is adopted so that the lower rail comprising members 3, 4, 6 and 13 shown in FIG. 1 is fixed at an optional position by means of set boards, the aperture of the linear contact area through which the molten zinc is withdrawn can easily be adjusted even when it is broadened due to long-time operation of the apparatus.

Figure 2:
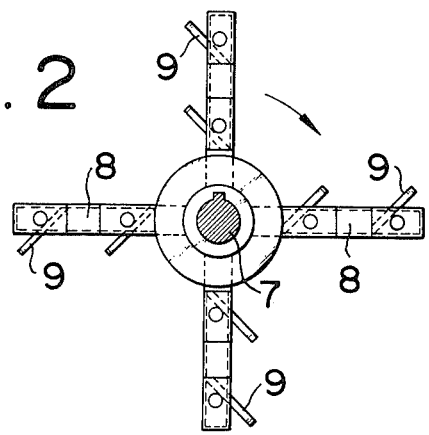
FIG. 2 is a diagram showing the section taken along the line A–A' in FIG. 1.

This invention will now be illustrated in detail by reference to the following Example showing the treatment of dross using the apparatus of this invention as shown in FIGS. 1 and 2.

EXAMPLE 1

An apparatus comprising as a dross container a saucer-like cylinder having a diameter of about 1 m, the length of the side wall in the vertical portion being 30 cm and the inclination angle of the bottom portion of an inverse conical form being about 20°, and 8 agitating scraper plates disposed and arranged as in FIGS. 1 and 2, was located in the proximity of a melting furnace for deposited zinc plates from the zinc electrolysis. The dross treatment was conducted under the conditions shown in Table 1 to obtain results shown in Table 1.

Table 1

| Run No. | Conditions | | | Dross Fed | | | Yields of Squeezed Metal | |
|---|---|---|---|---|---|---|---|---|
| | Direction of Rotation of Scraper Plates | Rotation Number of Scraper Plates, rpm | Time Required for Treatment of One Batch, Minutes | Amount Fed, Kg | Grade of Metallic Zinc, % | Content of Metallic Zinc, kg | Amount, kg | Metallic Zinc Recovery Ratio *,% |
| 1 | Clockwise | 9 | 40 | 330 | 42.3 | 140 | 121 | 86.4 |
| 2 | Clockwise | 12 | 30 | 362 | 44.5 | 161 | 146 | 90.7 |
| 3 | Clockwise for 4 minutes, counter-clockwise | 12 | 25 | 312 | 40.4 | 126 | 114 | 90.5 |

Table 1-continued

| Run No. | Conditions | | | Dross Fed | | | Yields of Squeezed Metal | |
|---|---|---|---|---|---|---|---|---|
| | Direction of Rotation of Scraper Plates | Rotation Number of Scraper Plates, rpm | Time Required for Treatment of One Batch, Minutes | Amount Fed, Kg | Grade of Metallic Zinc, % | Content of Metallic Zinc, kg | Amount, kg | Metallic Zinc Recovery Ratio *,% |
| | for 1 minute | | | | | | | |

*Calculated on the assumption that the grade of squeezed zinc was 100%.

As is seen from the results shown in the above Table 1, when the apparatus of this invention is used for the dross treatment, about 90% of metallic zinc contained in the dross can be recovered and formed into a final product without supplying heat from the outside.

What we claim is:

1. Apparatus for recovering metallic zinc from dross discharged from a zinc melting furnace, comprising:
   a. a saucer-like container for receiving dross, said container having a generally truncated conical bottom with an opening through the truncated apex;
   b. a vertical rotary shaft extending into said container;
   c. a plurality of agitating scraper plates attached to said rotary shaft so as to rotate therewith within said container and separate metallic zinc from the dross;
   d. a plug having a hollow, cylindrical shape inserted into the opening through the bottom of the container;
   e. attachment means to attach said plug to the bottom of the container such that it may be removed from the opening to allow drainage of the secondary dross, from which the zinc has been removed, from the container;
   f. a rotor attached to the lowermost end of said rotary shaft, the lowermost portion of the rotor and the uppermost portion of said plug defining a slight aperture so as to allow only the passage of separated zinc between the rotor and the plug and, subsequently, through the hollow plug.
   g. wherein the scraper plates provide a clearance sufficient to form a thick insulating and protective layer of dross along the wall of the container between the wall of the container and each scraper plate whereby said insulating and protective layer of dross, formed at said wall, prevents corrosion of said wall by the molten metallic zinc and maintains the temperature of the dross within the separator.

2. An apparatus as set forth in claim 1 wherein said attachment means for the hollow cylindrical plug comprises: a supporting member to which the plug is attached; means pivotally attaching one end of the supporting member to the bottom of the container; and means to removably affix the other end of the supporting member to the container.

3. An apparatus as set forth in claim 2 wherein said plurality of agitating scraper plates are attached to a plurality of arms extending radially from said vertical rotary shaft, such that their transverse axes are at an angle of approximately 45° with the longitudinal axes of the respective radial arms.

4. An apparatus as set forth in claim 1 wherein said hollow cylindrical plug has its uppermost portion shaped in an inverse conical form having an inclination angle almost equal to that of the conical bottom portion of said container.

5. An apparatus as set forth in claim 4 wherein said plurality of agitating scraper plates are attached to a plurality of arms extending radially from said vertical rotary shaft, such that their transverse axes are at an angle of approximately 45° with the longitudinal axes of the respective radial arms.

6. An apparatus as set forth in claim 1 wherein said plurality of agitating scraper plates are attached to a plurality of arms extending radially from said vertical rotary shaft, such that their transverse axes are at an angle of approximately 45° with the longitudinal axes of the respective radial arms.

7. An apparatus as set forth in claim 6 wherein a distal end of each scraper plate is substantially parallel to be inclined face of the bottom portion of the container.

* * * * *